No. 841,687. PATENTED JAN. 22, 1907.
N. M. HENDERSON.
COTTON PICKER.
APPLICATION FILED SEPT. 13, 1906.
3 SHEETS—SHEET 1.
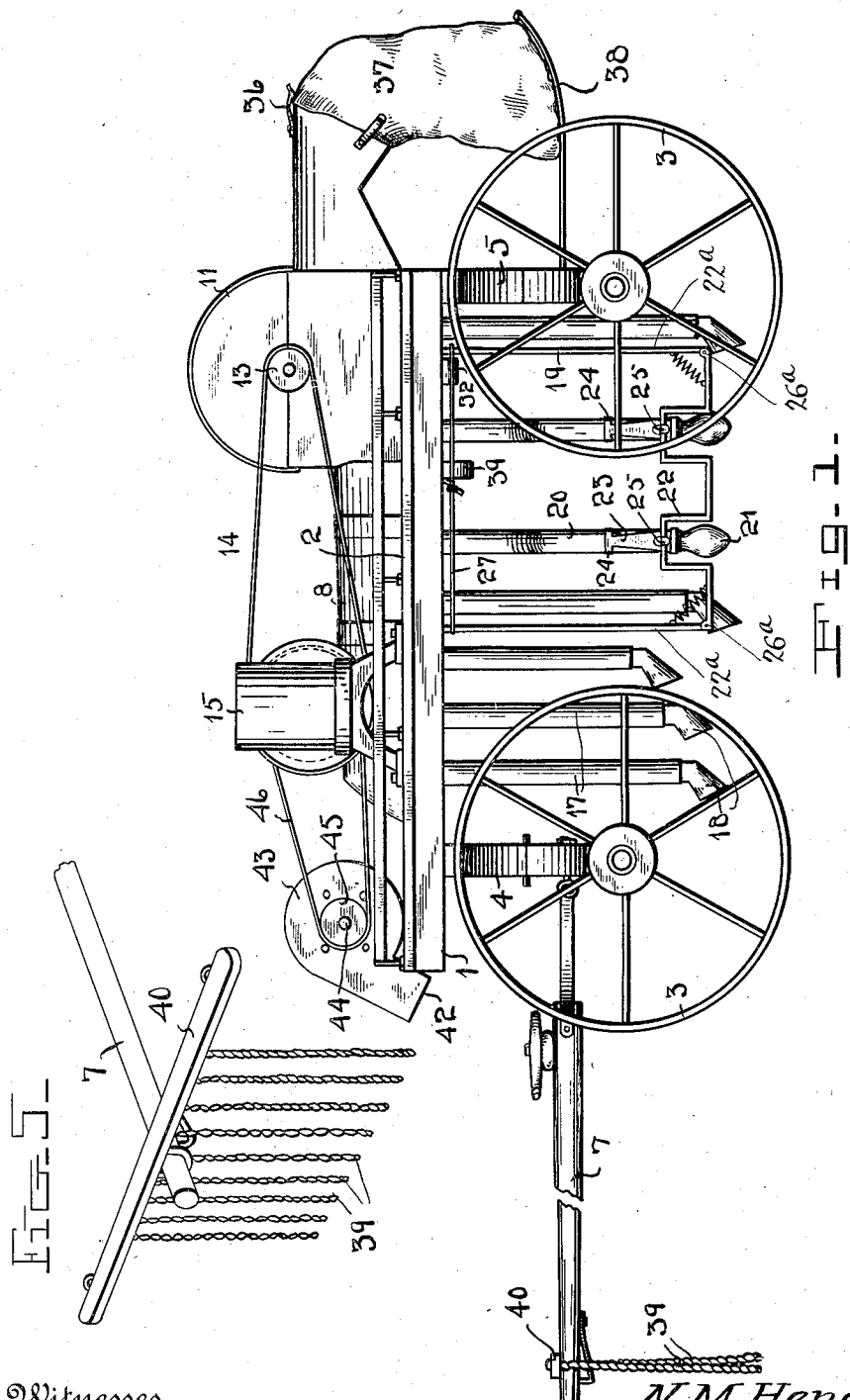
Witnesses
Chas. Parker
C. H. Griesbauer
Inventor
N. M. Henderson
by 
Attorneys No. 841,687. PATENTED JAN. 22, 1907.
N. M. HENDERSON.
COTTON PICKER.
APPLICATION FILED SEPT. 13, 1906.

3 SHEETS—SHEET 2.

Witnesses
Chas. Parker.
C. H. Griesbauer.

Inventor
N. M. Henderson.
by H. B. Willson & Co.
Attorneys

No. 841,687. PATENTED JAN. 22, 1907.
N. M. HENDERSON.
COTTON PICKER.
APPLICATION FILED SEPT. 13, 1906.

3 SHEETS—SHEET 3.

Witnesses
Chas. Parker
O. H. Giebauer

Inventor
N. M. Henderson.
by H. B. Willson & Co
Attorneys

UNITED STATES PATENT OFFICE.

NATHANIEL M. HENDERSON, OF HENDERSON, NORTH CAROLINA.

COTTON-PICKER.

No. 841,687.          Specification of Letters Patent.          Patented Jan. 22, 1907.

Application filed September 13, 1906. Serial No. 334,527.

*To all whom it may concern:*

Be it known that I, NATHANIEL M. HENDERSON, a citizen of the United States, residing at Henderson, in the county of Vance and State of North Carolina, have invented certain new and useful Improvements in Cotton-Pickers; and I do declare the following to be a full, clear, and exact description of the invention, such as will enable others skilled in the art to which it appertains to make and use the same.

This invention relates to improvements in cotton-picking machines.

Figure 2:
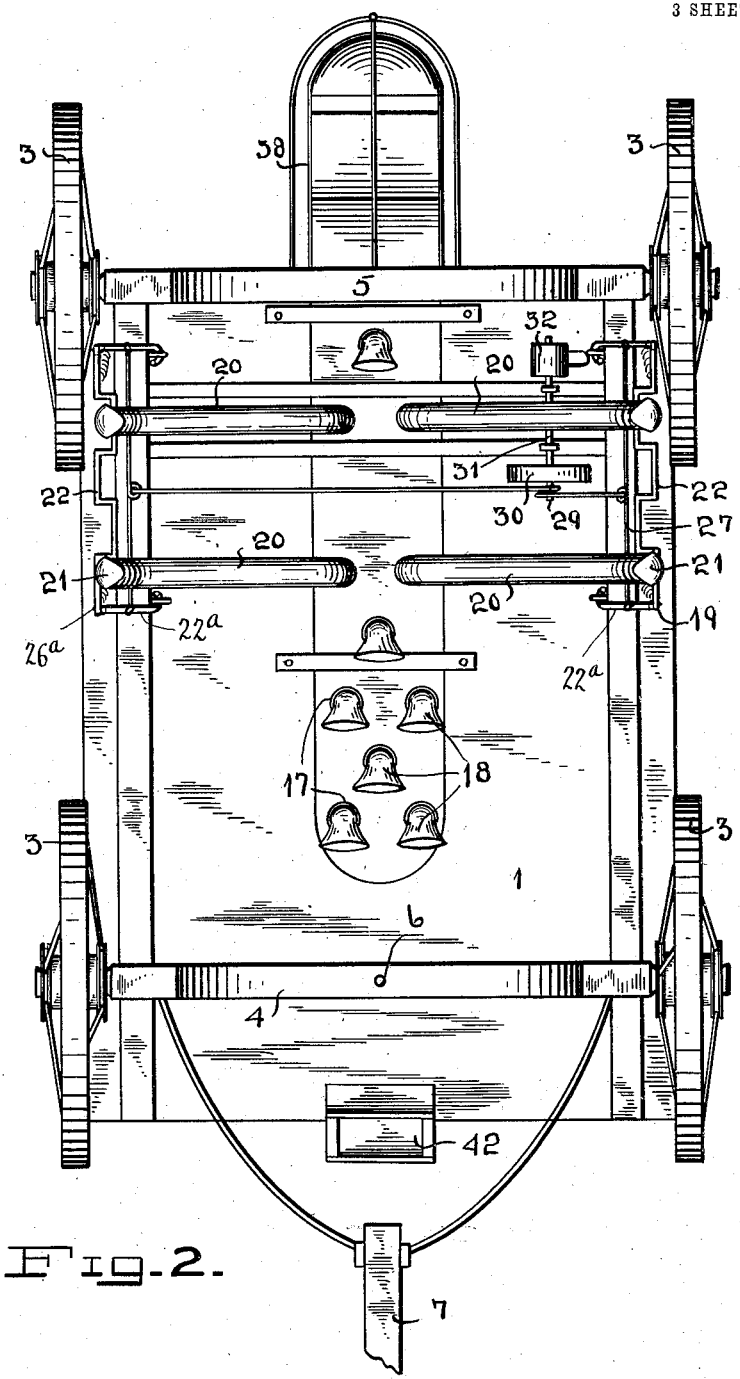
Figure 3:
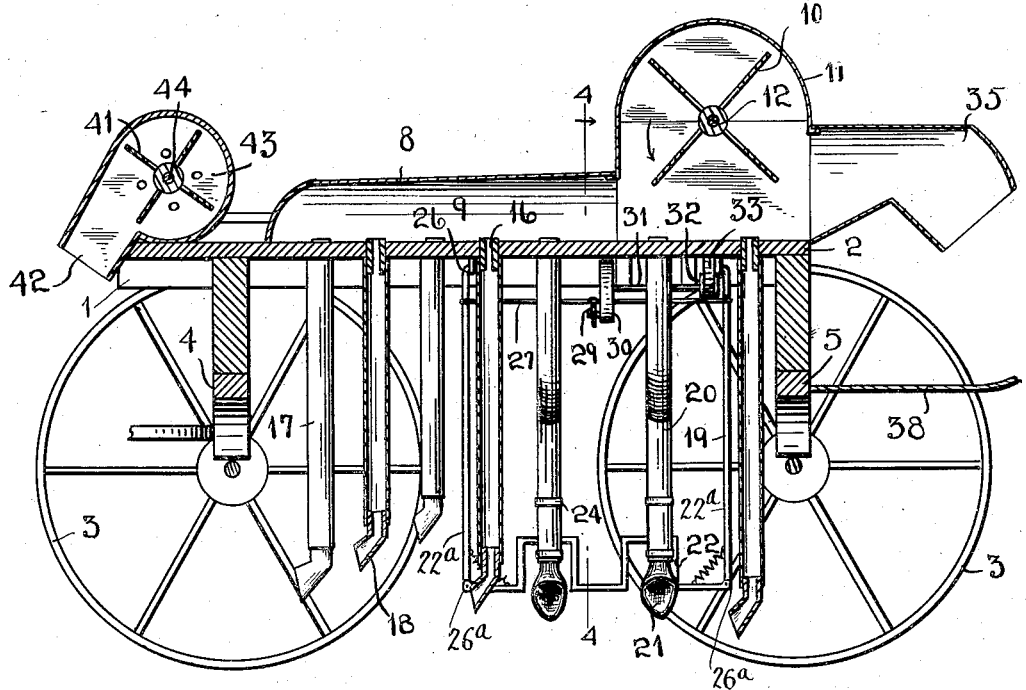
Figure 4:
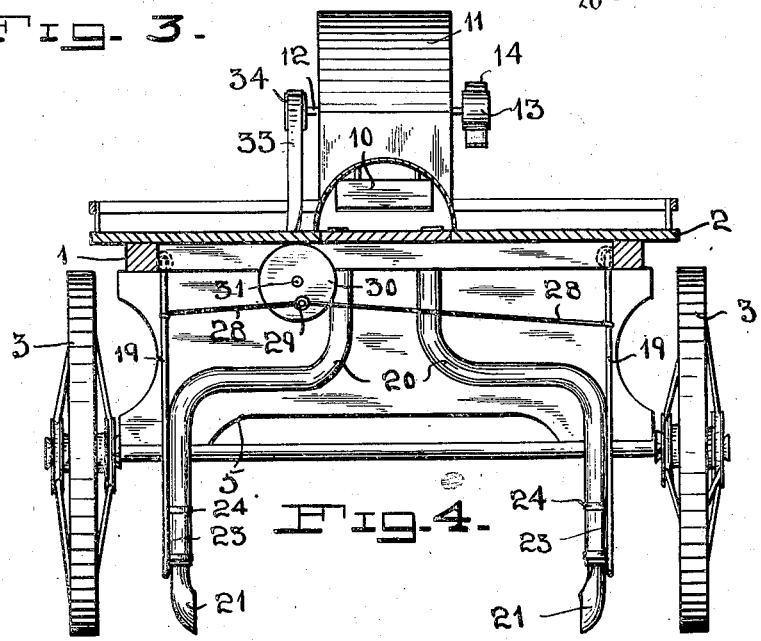

The object of the invention is to provide a simple and practical machine of this character which may be driven by suitable power over one or more rows of cotton and will pick the cotton from the plants by suction and discharge it into sacks or other receptacles.
With the above and other objects in view the invention consists of certain novel features of construction, combination, and arrangement of parts, as will be hereinafter described and claimed.
In the accompanying drawings, Figure 1 is a side elevation of the improved cotton-picking machine. Fig. 2 is a bottom plan view of the same. Fig. 3 is a vertical longitudinal section. Fig. 4 is a vertical transverse section taken on the plane indicated by the line 4 4 in Fig. 3; and Fig. 5 is a detail perspective view of the front end of the draft-tongue, showing the breast-pole and cords depending therefrom.
The improved cotton-picking machine comprises a wheeled supporting frame or body 1, which may be of any suitable form and construction, but which is here shown as a wagon having a high platform 2, mounted upon front and rear supporting-wheels 3, journaled on axles 4 5, which may be arched, if desired, the front one, 4, being pivoted by the usual king-bolt 6 and having a draft tongue or pole 7 connected to it. The wagon may be of any desired width, so as to straddle one or more rows of cotton.

While the machine is preferably drawn through a cotton-field by draft-animals attached to the tongue 7 in the usual manner, it will be understood that the machine may be propelled by steam, electricity, or other power.

Provided upon the top of the platform 2 of the wagon is a longitudinally-extending cas-
ing 8, which provides a vacuum-chamber 9, through which air is sucked or drawn by a rotary fan 10, mounted in an enlarged portion 11 of the casing 8 at its rear end. This fan is mounted upon a transverse shaft 12, which extends through suitable bearings in the sides of the fan-casing 11 and has upon one end a band wheel or pulley 13, which is driven by a belt 14 from a gas-engine 15 or other suitable motor mounted upon the platform 2.

Opening into the longitudinally-extending vacuum or suction chamber 9 are a plurality of nipples 16, which extend through the platform 2 and have suitably secured upon their lower projecting ends flexible suction-tubes 17, constructed, preferably, of rubber. These tubes have suitably secured in their lower ends metal funnels 18, into which the cotton is sucked or drawn by the suction created in the tubes and the chamber 9. Any number of the depending tubes 17 may be provided, and they may be arranged in any suitable manner, so that they will reach all of the cotton upon the plants over which the machine passes. They are of unequal length, so that some will travel over the tops of the plants and others work through the middle and lower portions of the plants.

In order to more effectively gather the cotton along the sides of the plants, I preferably employ two or more laterally - swinging frames 19, upon which one or more tubes 20 of rubber, metal, or other flexible material are secured. These tubes are similar to the tubes 17, their upper ends being connected to nipples opening into the chamber 9 and their lower ends being provided with funnels 21, the mouths of which open inwardly instead of forwardly, as do the funnels 18. The tubes 20 are somewhat longer than the tubes 17 and are connected by plates or cleats 23 to the lower bent portions 22 of the frames 19. If desired, the tubes 20 may be connected at two or more points upon the frames 19 instead of only to their lower portions 22, as illustrated. Each of these frames 19 consists of one of the bent portions 22 and two parallel arms 22ª, which latter have their upper ends loosely pivoted in staples or other suitable bearings 26, provided upon the bottom of the platform 2, and their lower ends pivoted at 26ª to the ends of the bent portion 22. This construction permits the frames 19 to be swung or oscillated transversely and at the same time swing longitudinally when they strike stones or other obstructions.

The two arms or portions 22ª are connected by rods 27, which latter have connected to their centers pitman-rods 28. These rods 28 have their inner ends pivoted upon a crank-pin 29 on a disk 30, which is secured on one end of a shaft 31, mounted in suitable bearings on the bottom of the platform 2. Upon the opposite end of the shaft 31 is a pulley 32, which is connected by a belt 33 to a pulley 34 upon one end of the fan-shaft 12, said belt extending through a suitable slot in the platform 2. It will thus be seen that when the engine 15 is in motion and the fan 12 driven the shaft 31 will be rotated and will impart its motion to the two frames 19, which will be swung laterally to move the funnels 21 on the tubes 20 into and out of the sides of the cotton-plants.

While but two of the tubes 20 are shown upon each of said frames, it will be understood that any number may be provided, and they may be arranged in any suitable manner. The cotton as it is sucked up through the tubes 17 and 20 and into the chamber 9 is forced rearwardly by the fan 12 and out through a discharge-spout 35, arranged at the rear end of the casing 8. Suitable clips or fastening devices 36 are provided on this spout for holding the open mouth of a bag or sack 37 thereon. The cotton is discharged into this sack, which has its bottom supported upon a frame 38, projecting from the rear axle 5, and consisting, preferably, of metal rods, as clearly shown in Fig. 2.

In order to prevent dry leaves, trash, and the like from being sucked into the funnels 18 21, together with the cotton, I arrange upon the front of the draft-tongue 7 or at any other suitable point upon the machine in advance of said funnels a plurality of depending strands 39, of cord, rope, or other suitable flexible material. As clearly shown in Figs. 1 and 5, these flexible strands depend from the breast-pole 40 on the front end of the tongue 39; but they may be located and arranged in any other suitable manner. It will be seen that as the machine moves forwardly the ropes or cords 39 travel through the cotton-plants and knock off dead leaves, trash, and the like, said ropes being stiff enough for this purpose, but not stiff enough to knock off or injure the cotton. To more effectively remove the dead leaves and trash after the same has been loosened, I preferably arrange on the front of the platform 2 a rotary fan 41, which directs its blast downwardly from a downwardly and forwardly inclined outlet 42 on its casing 43. The fan 41 within this casing is fixed upon a shaft 44, which carries a pulley 45, adapted to be driven by a belt 46 from the engine or motor 15.

In operation as the machine is drawn or propelled through the cotton-field and over one or more rows of cotton-plants the cords 39 brush the plants and loosen the dry leaves and trash, so that the blast from the fan 41 blows the same away. As the machine advances, cotton is picked or sucked into the funnels 18 21 through the tubes 17 20 and the chamber 9 and discharged by the fan 12 from the spout 35 and into one of the sacks 37. When one sack is filled, it is removed and another one is applied to the spout or discharge 35. Any number of sacks may be carried on the platform 2, and a suitable surrounding frame or rail may be provided on the platform to keep the sacks thereon.

It will be observed that this machine is a great labor-saver and that the cotton may be rapidly picked or harvested at a comparatively small cost. It will also be observed that the machine is of simple and comparatively inexpensive construction and very easy to handle and operate.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. In a machine of the character described, a wheeled support, a vacuum-chamber thereon having a discharge at its rear end, an exhaust-fan in said chamber, oppositely-disposed, transversely-swinging frames upon said support, flexible tubes depending from said support and in communication with said chamber, some of said tubes being attached to said frames, funnels upon the lower ends of said tubes, a shaft, a crank-disk thereon, pitman-rods connecting said crank-disk and said frames, and means for rotating said shaft and the shaft of said fan.

2. In a machine of the character described, a support adapted to be moved through a cotton-field over rows of plants, flexible strands depending from said support to travel through the cotton-plants and loosen the dead leaves and trash, means for directing a blast of air through the cotton-plants to remove the loosened leaves and trash, and means for picking the cotton from the plants.

3. In a machine of the character described, a movable support, a vacuum-chamber thereon, a longitudinally-yieldable frame pivoted to swing transversely upon said support, a flexible tube attached to said frame and in communication with said chamber, and a funnel carried by said tube.

4. In a machine of the character described, a wheeled support, a vacuum-chamber thereon, laterally-swinging frames, each comprising loosely-pivoted side bars, and a connecting-bar, pivoted to said side bars, flexible tubes attached to said frames and in communication with said chamber, and funnels carried by said tubes.

In testimony whereof I have hereunto set my hand in presence of two subscribing witnesses.

NATHANIEL M. HENDERSON.

Witnesses:
J. B. OWEN,
A. C. ZOLLIEFFERS.